(12) United States Patent
Lolling et al.

(10) Patent No.: US 11,124,432 B2
(45) Date of Patent: Sep. 21, 2021

(54) COMPOSITIONS, ARTICLES, AND METHODS FOR ABATEMENT OF HYDROCARBON, METALS, AND ORGANIC POLLUTANTS

(71) Applicant: AbTech Industries, Inc., Scottsdale, AZ (US)

(72) Inventors: Shawn M Lolling, Gilbert, AZ (US); Bruce R Gan, Tempe, AZ (US)

(73) Assignee: AbTech Industries, Inc., Scottsdale, AZ (US)

( * ) Notice: Subject to any disclaimer, the term of this patent is extended or adjusted under 35 U.S.C. 154(b) by 89 days.

(21) Appl. No.: 16/408,326

(22) Filed: May 9, 2019

(65) Prior Publication Data
US 2020/0354234 A1  Nov. 12, 2020

(51) Int. Cl.
*C02F 1/28* (2006.01)
*B01J 20/32* (2006.01)
(Continued)

(52) U.S. Cl.
CPC .............. *C02F 1/288* (2013.01); *B01J 20/20* (2013.01); *B01J 20/223* (2013.01); *B01J 20/26* (2013.01); *B01J 20/28007* (2013.01); *B01J 20/3007* (2013.01); *B01J 20/3078* (2013.01); *B01J 20/3204* (2013.01); *B01J 20/3206* (2013.01);
(Continued)

(58) Field of Classification Search
None
See application file for complete search history.

(56) References Cited

U.S. PATENT DOCUMENTS 5,863,440 A   1/1999  Rink et al.
5,866,641 A * 2/1999  Ronden .................. C08J 9/0023
                                                      521/54
(Continued)

FOREIGN PATENT DOCUMENTS

CN      104740932 A    7/2015
KR    10-0350395 B1    8/2002
(Continued)

OTHER PUBLICATIONS

Kolodynska et al.; Comparison of sorption and desorption studies of heavy metal ions from biochar and commercial active carbon; Chemical Engineering Journal, No. 307, pp. 353-363; 2017.
(Continued)

*Primary Examiner* — Chester T Barry
(74) *Attorney, Agent, or Firm* — Louis J. Hoffman; John Hammond (57) ABSTRACT

Material compositions have multifunctionality in abatement of water pollution: They are capable of removing hydrocarbons along with various types of other pollutants, such as metals and metal oxides, and phosphates and other organic material, from water streams. In certain embodiments, the multifunctional compositions are comprised of biochar particles, activated carbon particles, or metal (or metal oxide) nanoparticles bound to a cellulosic or other organic matrix material, which are adhered to styrene-butadiene-styrene granules embedded in an M-Class rubber matrix. Methods of synthesis of the multifunctional compositions and products, including filter cartridges and filters, that use such compositions are also disclosed.

36 Claims, 3 Drawing Sheets

(51) Int. Cl.
  *B01J 20/30* (2006.01)
  *B01J 20/28* (2006.01)
  *B01J 20/26* (2006.01)
  *B01J 20/22* (2006.01)
  *B01J 20/20* (2006.01)
  *C02F 103/00* (2006.01)
  *C02F 103/10* (2006.01)
  *C02F 101/32* (2006.01)
  *C02F 101/10* (2006.01)

(52) U.S. Cl.
  CPC .............. *C02F 1/281* (2013.01); *C02F 1/283* (2013.01); *C02F 1/285* (2013.01); *C02F 1/286* (2013.01); *C02F 2101/10* (2013.01); *C02F 2101/32* (2013.01); *C02F 2103/001* (2013.01); *C02F 2103/10* (2013.01); *C02F 2201/006* (2013.01); *C02F 2305/08* (2013.01)

(56) References Cited

U.S. PATENT DOCUMENTS

| | | | |
|---|---|---|---|
| 6,080,307 A | 6/2000 | Morris et al. | |
| 6,099,723 A | 8/2000 | Morris et al. | |
| 6,106,707 A | 8/2000 | Morris et al. | |
| 6,143,172 A | 11/2000 | Rink et al. | |
| 6,231,758 B1 | 5/2001 | Morris et al. | |
| 6,344,519 B1* | 2/2002 | Rink | B01D 17/0202 525/97 |
| 6,531,059 B1 | 3/2003 | Morris et al. | |
| 6,541,569 B1 | 4/2003 | Morris et al. | |
| 6,712,976 B2 | 3/2004 | Manzone | |
| 6,723,791 B2 | 4/2004 | Rink et al. | |
| 7,048,878 B2 | 5/2006 | Rink et al. | |
| 7,094,338 B2 | 8/2006 | Morris et al. | |
| 7,125,823 B2 | 10/2006 | Manzone | |
| 7,229,559 B2 | 6/2007 | Manzone | |
| 7,229,560 B2 | 6/2007 | Rink et al. | |
| 8,167,973 B2 | 5/2012 | Viswanathan | |
| 8,574,337 B2 | 11/2013 | Viswanathan | |
| 8,647,512 B2 | 2/2014 | Viswanathan | |
| 8,753,603 B2 | 6/2014 | Viswanathan | |
| 8,790,615 B2 | 7/2014 | Viswanathan | |
| 8,920,688 B2 | 12/2014 | Viswanathan | |
| 9,095,837 B2 | 8/2015 | Viswanathan | |
| 9,169,139 B2 | 10/2015 | Viswanathan | |
| 9,643,165 B2 | 5/2017 | Viswanathan | |
| 9,909,069 B2 | 3/2018 | Rogers | |
| 10,293,329 B2 | 5/2019 | Viswanathan | |
| 2006/0247332 A1* | 11/2006 | Coffey | C08K 5/0016 523/351 |
| 2012/0125854 A1* | 5/2012 | Holtslander | C09K 3/32 210/660 |
| 2013/0216435 A1* | 8/2013 | Geddes | G02B 21/16 422/82.08 |
| 2018/0016162 A1* | 1/2018 | Wang | C08K 3/01 |
| 2019/0357521 A1* | 11/2019 | Duerloo | E03F 5/0404 |

FOREIGN PATENT DOCUMENTS

| | | |
|---|---|---|
| KR | 10-2004-0084362 A | 10/2004 |
| KR | 10-0971512 B1 | 7/2010 |

OTHER PUBLICATIONS

Lima et al.; Efficacy of Chicken Litter and Wood Biochars and Their Activated Counterparts in Heavy Metal Clean up from Wastewater; Agriculture, No. 5, pp. 806-825; 2015.

Environmental Remediation Technical Session Abstracts; Biochar 2018 Conference; Chase Center on the Riverfront, Wilmington, Delaware; Aug. 20-23, 2018.

* cited by examiner

FIG. 5

COMPOSITIONS, ARTICLES, AND METHODS FOR ABATEMENT OF HYDROCARBON, METALS, AND ORGANIC POLLUTANTS

BACKGROUND

Technical Field

The present disclosure relates to materials and products for abatement of pollutants of the environment. In particular, the materials and products have multifunctionality in abatement of water pollution and are capable of simultaneously removing hydrocarbon/organic pollutants, as well as other pollutants, such as metallic and various types of organic pollutants, from water streams from sources such as industrial operations, mine tailing ponds, and storm water runoff.

Description of Related Art

Despite the ongoing passage and implementation of environmental laws and regulations, water pollution continues to be a problem in need of solutions, both in the United States and worldwide. There is a vast array of substances that are classified as water pollutants. Four broad categories of pollutants discussed in this disclosure are hydrocarbons (such as oils), inorganic salts and metals (and heavy metals in particular), phosphates and other organic pollutants, and synthetic organic compounds, such as VOC, PCB, and PFAS substances.

Compositions, products, and methods for abatement of hydrocarbon pollutants are known, and compositions, products, and methods for abatement of metallic, synthetics, and organic pollutants are known. Additionally, wastewater is produced by many sources. Storm water runoff is a type of wastewater produced from highways, bridges, parking lots, rooftops, and other impermeable surfaces. Industrial operations, such as hydraulic fracturing used in oil and gas extraction, also produce wastewater. Accidents at oil and gas wells, oil and gas transportation (via pipeline, tanker, rail, or truck), refineries, chemical plants, or pollution abatement facilities produce wastewater unintentionally and at great cost to the public and the private sector. Agricultural operations can produce large amounts of phosphate runoff and ground water contamination from the use of chemical fertilizers and animal waste fertilizers.

Wastewater from these sources often contains both hydrocarbon pollutants and metallic and phosphate pollutants. For wastewater to be discharged to a publicly owned treatment works (POTW), or discharged to ground or to a stream, river, lake, sea, or ocean, it is highly desirable that all of these pollutants—hydrocarbons, metals or metal oxides, synthetics, and phosphates—be removed to a level that is safe for human exposure (and in some cases, a level that is potable).

A broad range of compositions, articles, and methods are known for the removal of hydrocarbons from wastewater. Likewise, a broad range of compositions, articles, and methods are known for the removal of metals, synthetics, and phosphates from wastewater. In general, material compositions for removal of hydrocarbons from wastewater are very different from material compositions for removal of metals, synthetics, and phosphates from wastewater. This is to be expected because at a fundamental level, the chemistry of hydrocarbon removal from water is very different from that of metal, synthetics, and phosphate removal from water.

As an example, commonly owned U.S. Pat. No. 6,723,791 by Rink et al. discloses a process of forming a solid, compliant body for absorbing oil comprising mixing SBS and ethylene propylene diene monomer (EPDM); heating the mixture to a temperature below the melting point of the SBS material (which is about 160-200° C.), wherein the EPDM material of the mixture becomes plasticized; extruding the resulting mixture through a die; and allowing the extruded mixture to cool and expand. The '791 patent further discloses compositions for absorbing oil prepared according to the disclosed methods. The disclosure of this patent is incorporated herein by reference.

Under the heading, "Forming the Copolymer Bodies," the '791 patent describes at length the process conditions for forming the composition of an oil-absorbent material and solid compliant bodies made of the composition.

The '791 patent, with reference numerals and figure references removed, teaches: "Upon passing through the die, the SBS granules, which have been compressed somewhat by being forced through the die, reexpand, 'fluffing' the extruded material while it cools and hardens. The expansion is further assisted by air remaining in the mixture. The extruded material is cut into suitable lengths to form the final bodies. When cooled and resolidified outside the extruder, the EPDM matrix forms a durable but permeable structure for the SBS granules and provides mechanical integrity to the resulting bodies. Thus, bodies formed in accordance with the preferred method do not break or crack absent extreme elastic deformation, despite the presence of fissures. Also, fragments of such bodies do not detach easily from bodies in the form of flakes, crumbles, or dust, even with rough handling. The fluffing effect (typically undesired in extrusion processes) is beneficial because it forms inter-granular fissures in the EPDM matrix, throughout the structure. However, the fissuring is not so great as to cause loss of structural integrity. As noted above, fissures are preferred to facilitate rapid passage of oil into bodies and to reduce the incidence of gel blocking, permitting continued absorption. In bodies formed according to the preferred method, any reduction in absorbency caused by the binder (compared to a body composed exclusively of higher-absorbent material, such as SBS) is more than offset by the increase rates of contact between oil and SBS caused by the fissuring and rough external texture and the reduced tendency to premature gelation."

Based upon those and similar teachings and upon experience obtained in developing the hydrocarbon absorbing compositions and products, in general, ordinarily skilled artisans would not expect to achieve success in making a composition having multifunctional pollution abatement capabilities simply by adding to the constituents that provide hydrocarbon absorbing capabilities other constituents having metal and phosphate (or other organic pollutant) abatement properties. In making the hydrocarbon absorbing compositions, certain process conditions must be maintained to produce product bodies that fluff in the desired amount, form inter-granular fissures, have high structural integrity, and have high hydrocarbon absorbency. Adding additional materials not needed for hydrocarbon absorbency would be expected to reduce the advantageous properties of the compositions and products of the '791 patent; thus artisans would not be motivated to attempt to modify such compositions to add metal and organic pollutant abatement capability.

In particular, the material described by the '791 patent has a high hydraulic conductivity, i.e., the media maintains a low pressure drop as water passes through it—the pressure at the outlet is only slightly lower than the pressure at the inlet, which allows large volumes of water to flow through the media and be filtered without resulting in backup. Restricted flow limits the rate at which the liquid can be purified and decontaminated. In storm water and end-of-pipe applications, pressure drops can be especially problematic, such as if water backs up into streets, buildings, etc. In industrial applications, pressure drops can necessitate use of large or expensive pumping systems to boost pressure through the media. But because of the variable flows and potentially massive volumes associated with storm water, it is not practical to use pressure boosting pumps in storm water applications, and those rely on gravity feeds instead.

Many materials known to have metal, synthetics (such as PFAS), and phosphate abatement capability, including cellulose (wood) media in natural form or pyrolyzed as biochar or activated carbon, by contrast, are highly compressible and would tend to impart a severe pressure drop across the media if deployed with the material of the '791 patent or if deployed in storm water applications. Accordingly, storm water treatment systems do not typically use cellulose media in natural or biochar form, and if used, do not do so efficiently. Blending cellulose media with the material of the '791 patent would normally be expected to result in undesired pressure drop, on account of the high compressibility of cellulose media, resulting from its small particle size, and in the case of biochar, from its lack of structural strength. Also, blending cellulose media in wood chip form with the material of the '791 patent could damage the other material on account of the jaggedness of the wood chips.

In instances where a wastewater source contains multiple pollutants including hydrocarbons, metals, synthetics, and phosphates, therefore, it is common to perform removal of pollutants in a serial manner, where hydrocarbon pollutants are first removed and metal pollutants are next removed (or vice versa). In some circumstances, a third operation may be needed to remove phosphate or synthetic pollutants.

At minimum, however, performing serial removal operations is costly and time consuming. In certain situations, serial operations may not be possible for various practical reasons. For example, in the treatment of storm water in subterranean conduits or at street level collection gratings and curbside ports, there may not physically be sufficient room to arrange a hydrocarbon extraction system and a metal or phosphate extraction system in series.

Accordingly, there remains a need for compositions, methods for making such compositions, and devices including such compositions, which compositions are capable of simultaneously removing hydrocarbon pollutants and other pollutants (such as metal pollutants, synthetic pollutants, and phosphate pollutants) from wastewater streams. Improved material compositions, and improved devices and methods for utilizing same, capable of removing both hydrocarbons and heavy metals, in particular, provide significant benefits.

SUMMARY

The present disclosure identifies material compositions, methods of synthesis thereof, and products including the compositions, in which the compositions have multifunctionality in abatement of water pollution. Disclosed compositions are capable of removing various kinds of hydrocarbons and metals from water streams. The compositions may also remove phosphates and synthetics from water streams.

Disclosed compositions include an organic-based matrix material (OMM). The OMM may be in natural form or in pyrolyzed form, such as biochar. The OMM is preferably cellulosic (such as wood) but may also include biochar from the pyrolysis of non-cellulosic organic matter such as pyrolyzed mushrooms (or other fungi) or pyrolyzed manure. Ordinarily, one would expect such media to physically compress or compact to inhibit water flow when used in a composition for pollution abatement of liquids, but such media have been successfully integrated into highly permeable multifunctional compositions for abatement of water pollution, as will be described subsequently herein.

In one aspect of the present disclosure, compositions of matter are provided comprising biochar particles attached to styrene-butadiene-styrene (SBS) granules embedded in an M-Class rubber (MCR) matrix. In this composition, as well as the other compositions described in this summary, the MCR may be specifically EPDM. The biochar particles may be present, in one example, at a proportion of between 20 and 28 percent of total weight of biochar particles, SBS, and EPDM. In certain embodiments, the biochar particles may be impregnated with metal nanoparticles.

In another aspect of the present disclosure, compositions of matter are provided comprising activated carbon particles attached to styrene-butadiene-styrene (SBS) granules embedded in an M-Class rubber matrix. The activated carbon particles may be present, in one example, at a proportion of between 20 and 24 percent of total weight of activated carbon particles, SBS, and EPDM.

In another aspect of the present disclosure, compositions of matter are provided comprising metal nanoparticles attached to or embedded in an MCR matrix. The metal nanoparticles, which may include elemental iron and oxides of iron, are bound to a cellulosic matrix material to form a metal impregnated cellulose. The cellulosic matrix material may be wood powder, wood sawdust, or wood chips. The cellulosic matrix material may be pyrolyzed to be in a charred form, i.e., biochar. The cellulosic matrix material of the compositions is attached to styrene-butadiene-styrene (SBS) granules.

In certain embodiments, the metal nanoparticles may include elemental iron or oxides of iron. In other embodiments, the metal in elemental or oxide form may be aluminum, scandium, titanium, vanadium, chromium, manganese, cobalt, nickel, copper, zinc, gold, platinum, silver, palladium, silicon, zirconium, antimony, bismuth, tungsten, barium, tin, and molybdenum.

As used herein, the term "metal impregnated cellulose" ("MIC") is meant to indicate metal nanoparticles bound to cellulose particles, such as wood powder, wood sawdust, or wood chips. In certain embodiments, the MIC may contain about 10-50% by weight of metal oxide.

The metal nanoparticles are capable of binding to metal pollutants, and also phosphate pollutants, to remove such pollutants from a water stream.

The term "binding" is not limited to any one particular mechanism and may result from chemical substitution, chelation, absorption, adsorption, or other phenomena.

Another aspect of the present disclosure relates to a method of forming a solid body capable of removing oil and metallic elements entrained in a volume of water. The method comprises forming a mixture of biochar particles, SBS, and MCR by mixing those constituents at a temperature of at least 95° F. (35° C.) so as to cause expansion of the SBS without melting the SBS, whereby the biochar particles are adhered to the SBS granules; feeding the biochar particles, SBS, and MCR mixture into an extruder and causing concurrent flow of the biochar particles, SBS, and MCR mixture along a barrel of the extruder, while heating the mixture to a temperature at which the MCR in the mixture is plasticized but the SBS does not melt; and extruding the concurrent flow of the biochar particles, SBS, and MCR through a die to form an extrudate. The extrudate cools and expands to form a product that may be cut into fragments for use in pollution abatement devices. In an alternative embodiment, the method may be performed using activated carbon particles instead of biochar particles.

In an alternative aspect, the method may be performed using metal nanoparticles bound to a cellulosic OMM instead of biochar particles. The steps of forming a mixture of metal nanoparticles bound to the OMM, SBS, and MCR mixture, feeding the mixture into an extruder, and extruding the concurrent flow of the OMM with bound metal nanoparticles, SBS, and MCR through a die to form an extrudate are performed in a similar manner to the manner described in the previous paragraph. In certain embodiments, the metal nanoparticles may be iron nanoparticles.

Another aspect relates to products for capturing oil and metallic elements or phosphorous entrained in a volume of water, which products include the multifunctional characteristics disclosed herein. Such products include filter media and skimmer media. In certain embodiments, the products having the multifunctional characteristics disclosed herein are formed into solid bodies comprised of biochar or activated carbon particles attached to SBS granules embedded in an MCR matrix. In alternative embodiments, the product may include the multifunctional characteristics disclosed herein are formed into solid bodies comprised of metal nanoparticles bound to an OMM attached to SBS granules embedded in an MCR matrix.

An alternative product may be a filter device for capturing oil, metallic elements, and phosphorous (or other pollutants) entrained in a volume of water in a constrained flow. The device may be structured as a filter, filter cartridge, or skimmer and may include a multitude of expanded, fractured bodies comprised of biochar or activated carbon particles, or alternatively, metal nanoparticles bound to an OMM, attached to SBS granules embedded in an MCR matrix, and a filter module or container supporting the bodies between an entry port for the water flow and an exit port for the water flow. The filter device with such bodies may be deployed in a pipe, or as a filtration cartridge in a filtering structure, or as a filter module having an open recess for the bodies.

Another aspect of the present disclosure relates to a method for capturing oil, metallic elements, and phosphorous entrained in a volume of water. The method includes directing flow of a water stream through interstices of a multitude of irregular, contaminant-sorbent, hydrophobic bodies of a filter medium, which filter medium may be comprised of biochar particles, or activated carbon, or metal nanoparticles bound to an OMM attached to SBS granules embedded in an MCR matrix, or other disclosed compositions.

BRIEF DESCRIPTION OF THE DRAWINGS

FIG. 2 is an outline of the copolymer fragment, of which FIG. 1 shows a detail.

The disclosure refers to certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

In the drawings, like reference numerals have been used throughout to designate identical elements. The drawings are to be considered exemplary and are for purposes of illustration only. The dimensions, positions, order, and relative sizes depicted in schematic renderings in the drawings may vary from those shown.

The terms "a" and "an" and variations thereof represent the phrase "at least one."

The terms "comprising," "comprises," "including," "includes," "contains," "having," and any variations thereof should not be interpreted as limited to the elements listed thereafter but rather as open-ended terms, as though the phrase "at least" were appended thereafter.

Similarly, the terms "can" and "may" and their variants are intended to be non-limiting, such that recitation that an embodiment can or may comprise certain elements or features does not exclude other embodiments of the present technology that do not contain those elements or features.

The conjunction "or" is to be construed inclusively (i.e., one, another, or both), unless it is explicitly stated otherwise (e.g., by use of "either . . . or," "only one of," or similar language) or two or more of listed alternatives are mutually exclusive within the particular context, in which case "or" would encompass only those combinations involving non-mutually exclusive alternatives.

The term "substantially," as modifying a parameter having a stated limit, is to be construed as meaning something that effectively possesses the same property or achieves the same function as that of the stated limit, and includes exactly the stated limit as well as insignificant deviations therefrom.

The term "approximately" is to be construed as meaning something having substantially the stated value, and includes exactly the stated value as well as insignificant variations therefrom.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the inventive scope of the present disclosure.

It is also to be understood that any connection references used herein (e.g., "attached," "coupled," "connected," and "joined") are to be construed broadly and may include intermediate members between a collection of elements and relative movement between elements unless otherwise indicated. As such, connection references do not necessarily imply that two elements are directly connected and in fixed relation to each other.

Unless otherwise specified, all words used herein carry their common meaning as understood by a person having ordinary skill in the art.

In cases where alternative examples are listed, it is to be understood that combinations of any of the alternative examples are also envisioned. The scope of the invention is not to be limited to the particular embodiments disclosed herein, which serve merely as examples representative of the limitations recited in the issued claims resulting from this disclosure, and the equivalents of those limitations.

Various features may be grouped together in particular example embodiments or in particular figures for the purpose of streamlining the disclosure, but this method of disclosure should not be interpreted as reflecting an intention that any claimed embodiment requires more features than are expressly recited in a particular claim. Rather, it is to be understood that features from any figure or embodiment can be used in combination with features of other figures or embodiments and that no feature should be deemed essential. Inventive subject matter may lie in less than all features of a single disclosed example embodiment or in a single figure. Thus, the appended claims are hereby incorporated into the detailed description, with each claim standing on its own as a separate disclosed embodiment. Moreover, the present disclosure shall be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed in combination herein. Conversely, the scope of the appended claims does not necessarily encompass the whole of the subject matter disclosed herein.

Absent use of the word "means" or the phrase "step for" in a claim, invocation of provisions of law relating to "means/function" or "step/function" is not intended.

The abstract is provided as required as an aid to those searching for specific subject matter within the patent literature. However, the abstract is not intended to imply that any elements, features, or limitations recited therein are necessarily encompassed by any particular claim. The scope of subject matter encompassed by each claim shall be determined by the recitation of only that claim.

In certain embodiments in which the compositions of the present disclosure are intended for use in a filter device, the compositions are formed from copolymer constituents as fragments that can be contained as filter media in a filter housing, pouch, bag, or other container.

Figure 1:
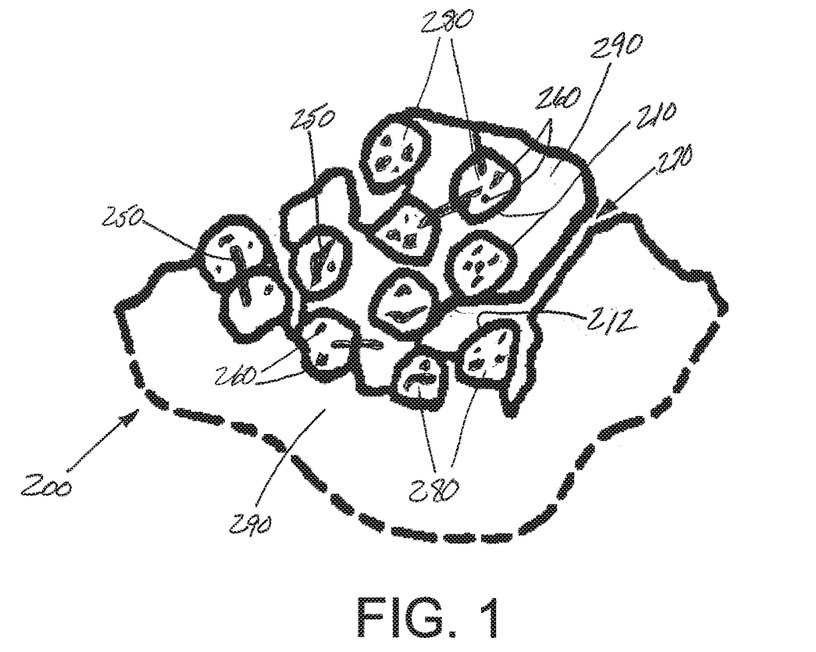
FIG. 1 is a detail view of a section through a copolymer fragment that includes biochar particles, activated carbon particles, or metal nanoparticles bound to an OMM according to various aspects of the present disclosure.
Figure 2:
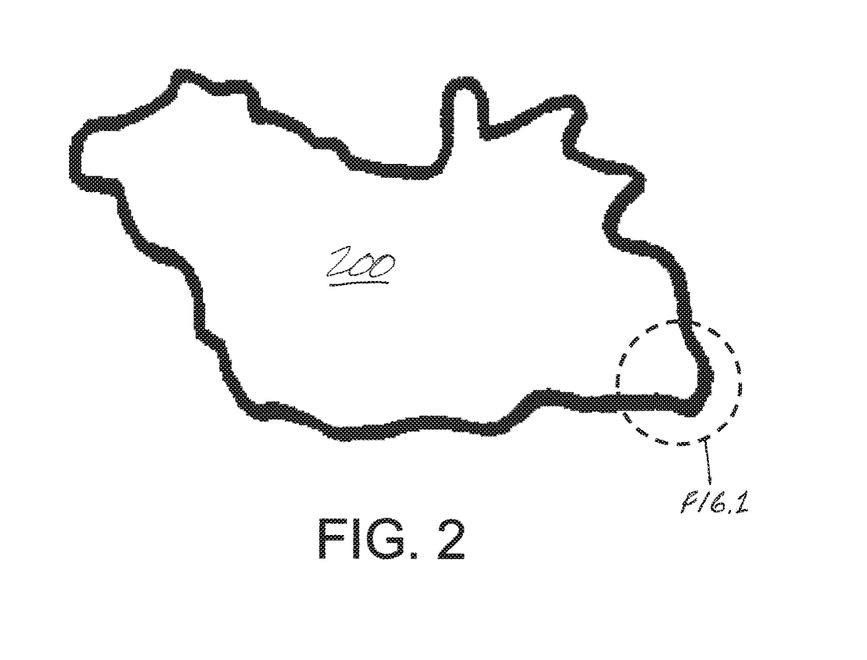

FIGS. 1 and 2 illustrate an example of a suitable copolymer fragment 200, with FIG. 1 showing a close-up view of the indicated portion of FIG. 2. FIG. 1 shows a macroscopic fragment 200 with an average diameter of approximately 1-2 cm, although because of the irregular shape, the diameter varies between fragments and on different lines across a single fragment. Fragment 200 includes an M-Class rubber (MCR) matrix 290 that forms a durable but permeable structure for SBS granules 280 and provides mechanical integrity to fragment 200.

As used herein, an "M-Class rubber" is a rubber as defined in ASTM Standard D-1418 of ASTM International, "Standard Practice for Rubber and Rubber Lattices—Nomenclature." This standard defines the M-Class as rubbers having a saturated chain of the polyethylene type. Exemplary M-Class rubbers as set forth in the standard include ACM, AEM, ANM, BIMSM, CM, CFM, CSM, EOM, EPDM, EPM, EVM, FEPM, FFKM, FKM, Type 1, Type 2, Type 3, Type 4, and Type 5 rubbers.

Surfaces of the SBS granules (e.g., surface 210 of granules embedded in the MCR or exposed surface 212 in interstices 270) and preferably also the MCR matrix 290 includes OMM particles 260 and 250, suitable for producing a material having multi-functional decontamination capability. OMM particles 250 and 260 may consist of activated carbon (AC) material, biochar (BC) material, or metal impregnated cellulose (MIC) powder or particles or some combination thereof.

When runoff containing water, oil, heavy metals, metal oxides, and phosphates comes into contact with the fragments, the copolymer material will absorb and entrap the oil. Additionally, the BC, AC, MIC, or other OMM particles will provide abatement of the heavy metals, metal oxides, synthetics such as PFAS, and phosphates.

Because the copolymer material is porous and hydrophobic, however, it will not become water-logged, and water will pass through the filter module, avoiding undue pressure drops. After the copolymer material has absorbed oil, subsequent runoff flowing past the material will not wash away the oil.

Polymer fragments are preferably fabricated not only to avoid restricting fluid flow but also to prevent liquid, to the extent practical, from collecting into channels. When liquid collects into channels within a mass of filter media, it tends to come into contact with only the limited amount of treated filter media that surrounds the channels. Fragments 200 can be placed in a filter or container without either concern (see below discussion of FIGS. 4 and 5). First, fragments 200 are irregularly shaped and not in powder form, which addresses fluid flow concerns by preventing them from compactly packing. Second, they have essentially random shapes, addressing the channeling concern by moving liquid laterally in such a filter.

To permit faster oil absorption and less gel blocking (a phenomenon in which a layer of absorbed oil at the exterior blocks access to inner portions of fragments 200), without increasing the distance from surface to center, it is further desirable to avoid smooth exterior "skins" on outer surfaces of fragments 200. The preferred method of formation of the compositions and fragments discussed below promotes that goal.

Also to reduce gel blocking, fragments 200 preferably have numerous fissures 270 extending into them from exterior surfaces, typically by several millimeters, and passing between the grains of SBS, as illustrated in FIG. 1. Such fissures increase the effective surface area of fragments 200 while still maintaining each as a coherent whole, permitting easy handling. The preferred formation method discussed below promotes that goal as well.

A method of making pollution abatement compositions of the present disclosure may be considered as comprising two operations. In a first operation, BC, AC, or MIC particles (or other OMM particles) are synthesized. In a second operation, the BC, AC, or MIC particles are combined with a hydrocarbon capturing medium to provide a composition that has multifunctionality in abatement of water pollution and that is capable of simultaneously removing hydrocarbon pollutants and metallic pollutants from a water source. Advantageously, the compositions may also be capable of removing phosphate pollutants from a water source. In some methods, the operations can be performed simultaneously.

Biochar (BC) is a high-carbon substance that may be produced by pyrolysis of natural organic substances, such as wood or manure, in the absence of oxygen. Biochar particles that are suitable for use in making the compositions of the present disclosure may be obtained from commercial sources. In experimental trials, BC particles were obtained from a supplier and screened to have a particle size below about 3350 microns (6 mesh screen), with particles of about 500 microns (35 mesh screen) also being present.

Activated carbon (AC) is a form of carbon processed to have small, low-volume pores that increase the surface area available for adsorption or chemical reactions. Activated carbon that is suitable for use in making compositions of the present disclosure may also be obtained from commercial sources. In experimental trials, AC particles were obtained from a supplier and screened to have a particle size below about 3350 microns (6 mesh screen), with particles of about 500 microns (35 mesh screen) also being present.

An alternative composition of the present disclosure includes MIC particles. In certain embodiments, the MIC particles may be comprised of metal nanoparticles bound to a cellulosic OMM. The cellulosic OMM may be wood material, provided in the form of chips or a powder. The cellulosic OMM may be pyrolyzed to convert the material to a charred form, i.e., biochar. As used herein, the term "pyrolyzed" derives from the word "pyrolysis," which is the thermal decomposition of materials at elevated temperatures in an inert atmosphere, resulting in a matrix material enriched in carbon.

As used herein, the term "wood particles" is meant to include any or all of (a) "wood powder," having a particle size of about 10-100 microns (aka micrometers or μm), (b) "wood sawdust," having a particle size of about 0.1-2 millimeters, and (c) "wood chips," having a particle size of about 2-20 millimeters.

Wood particles are typically irregular in shape, rather than spherical. Thus "particle size" as used here refers to a characteristic dimension such as length, width, or thickness, an average dimension, or a largest dimension (such that all particles can pass through a screen with holes of a specified size).

As used herein, the term "nanoparticles" refers to particles having particle size of less than about 1 μm, preferably less than about 100 nanometers (nm).

As used herein, the term "iron nanoparticles" includes nanoparticles of elemental iron, as well as nanoparticles of oxides of iron, including but not limited to $FeO$, $FeO_2$, $Fe_2O_3$ ($\alpha$-, $\beta$-, $\gamma$-, and $\epsilon$-phases), and $Fe_3O_4$.

U.S. Pat. No. 9,095,837 by Viswanathan (the "'837 patent"), the disclosure of which is incorporated herein by reference, discloses exemplary methods of producing metal nanocomposites.

The metal nanocomposites may include metals such as aluminum, scandium, titanium, vanadium, chromium, manganese, cobalt, nickel, copper, zinc, gold, platinum, silver, palladium, silicon, zirconium, antimony, bismuth, tungsten, barium, tin, and molybdenum.

In certain preferred embodiments, the metal may be selected from columns 7-13 of the Periodic Table of the Elements, i.e., aluminum, manganese, iron, cobalt, nickel, copper, and zinc. Those metals may be advantageous because their unfilled valence electron shells render them more effective in substituting for heavy metals in solution.

In some embodiments, the metal nanocomposites are comprised of iron nanoparticles or iron oxide nanoparticles bound to an OMM.

The '837 patent further discloses examples of syntheses performed on a scale performed in laboratory beakers, starting with quantities of wood chips on the order of grams, and using household microwave ovens as heating sources.

To cost-effectively produce large scale quantities of metal nanocomposites, on the order of hundreds of pounds of end product, experimental trials have resulted in a synthesis procedure for producing metal nanocomposites comprised of iron nanoparticles or iron oxide nanoparticles bound to wood particles in powder, sawdust, or chip form, modified and improved from the synthesis procedure disclosed in the '837 patent. In general, the procedure comprises the following operations:

Selecting wood as the organic matrix media (OMM) and preparing it in wood particle form.

Selecting a quaternary amine compound (quat) and reacting the quat with strong base (e.g., about 50 percent sodium hydroxide by weight) to convert the quat to an epoxide form.

Mixing the quat epoxide with the OMM in a reactor chamber under controlled temperature conditions, effective to join quat moieties to functional sites on the OMM while not burning it.

Allowing the quaternized OMM in the aqueous medium to cool, adding a solution of concentrated hydrochloric acid and ferric chloride to the reactor chamber at ambient temperature, mixing the chamber for a period of time effective to result in chelation of ferric ions with the functional sites on the OMM, and terminating the reaction prior to occurrence of acid degradation of the OMM.

Neutralizing the ferric chloride/hydrochloric acid solution and fluidizing the OMM in the reactor by adding concentrated ammonium hydroxide solution. As a result of the addition of $NH_4OH$, the OMM turns a dark red-orange "rust" color, which is indicative of iron (III) oxide, $Fe_2O_3$. This is in contrast to the iron-chelated media as disclosed in the '837 patent, which is described in Example 1 therein as appearing "as a black material," which is indicative of iron (II) oxide (a.k.a. ferrous oxide, $FeO_2$) or iron (II,III) oxide (a.k.a. magnetite, $Fe_3O_4$).

Continuously mixing the iron-chelated media while heating to a predetermined temperature, for a period of time effective to result in drying of the media.

Washing the iron-chelated media repeatedly as needed to remove excess residual iron oxide(s) and salts.

Drying the iron-chelated media to remove the residual water, resulting in the metal impregnated cellulose (MIC) particle intermediate product, suitable for combining with a hydrocarbon-removing material.

In certain embodiments, the MIC may include iron oxide nanoparticles, which are bound to the OMM. The iron oxide nanoparticles may be present in a proportion of about 10-50% by weight of iron oxide.

Turning now to the operation of combining OMM (including BC, AC, or MIC) particles with a hydrocarbon-capturing medium, to form a solid body capable of removing oil and metallic elements entrained in a volume of water, in certain embodiments, the hydrocarbon-capturing medium may be an oil-sorbing medium, similar to the media disclosed in the '791 patent.

The previously described sensitivity of the compositions of the '791 patent to mixing and extrusion process conditions notwithstanding, experimental trials have surprisingly revealed successful methods of forming a solid body capable of removing oil and metallic elements entrained in a volume of water, without degrading the composition's value in avoiding pressure drop. The discovery of successful methods was surprising because BC, AC, and MIC alone were found to not be permeable, i.e., BC, AC, or MIC packed in a column and wetted would simply form a plug in the column, which blocked flow. Thus it was expected that by adding BC, AC, or MIC to SBS and MCR, there would at least be a proportional reduction in permeability due to the presence of an impermeable constituent, and an even further reduction because it was expected that particles of BC, AC, or MIC would obstruct fissures that form in the SBS/MCR matrix.

One method includes first mixing SBS, MCR, and OMM particles, thus adhering the OMM particles with the SBS, introducing such mixture into an extruder, operating the extruder to cause flow and heating of the SBS/MCR/OMM particles to a temperature that is close to (a bit below or a bit greater than) the effective melting point of the MCR and less than the effective melting point of the SBS, and delivering the resulting mixture through a die as an extrudate.

Note that the pressure present in an extruder may lower the effective melting point of the constituent particles, compared to their nominal melting points. Except as otherwise stated, references to "melting point" in this specification refers to the melting point determined in ambient pressure, and references to "effective melting point" refers to melting point determined in the pressure inside of an extruder.

"Close to" for purposes of this specification means a temperature at the hottest part of the extruder (usually just before a die) that equals or exceeds a value that is 15° F. (8° C.) below the effective melting point of the material and equal or less than a value that is 10° F. (6° C.) above the effective melting point of the material. At temperatures just below the melting point, the MCR material will become highly plasticized and flow, even if not fully melted. If the temperature fails to reach the specified range, there is a greater risk of the MCR component remaining as "islands" of material, rather than spreading throughout the material, and the resulting extrudate, when cooled, has a greater chance of fragmenting excessively. If the temperature exceeds the specified range, not only will the energy costs of production be unnecessarily high but also the higher temperature will reduce the viscosity, allowing the other components to accumulate together, resulting in inconsistent distribution of the MCR material.

Note also that, to achieve a desired temperature, it may be necessary to adjust the temperature control of an extruder machine to a value that is somewhat less than the desired temperature. This is so because of heating variations within an extruder, but also especially because the pressure in the barrel of the extruder increases just before the end of the barrel close to the die (when a die exists), resulting in a higher temperature than the temperature at a temperature sensor used for feedback temperature control.

Such methods result in multifunctional compositions that are effective in removing hydrocarbon pollutants and metallic pollutants from water. The multifunctional compositions may also remove phosphate pollutants from water.

One preferred MCR is EPDM. It is noted that both EPDM specifically, and M-Class rubbers generally, have a wide range of melting points, such as −20° F. to 400° F. (−29° C. to 204° C.), with the melting point depending on the specific elastomer chosen.

For the compositions of the present disclosure, it has been determined that the rubber selected should have an effective melting point that is lower than the effective melting point of SBS. SBS has a nominal melting point between 160-200° C. Otherwise, during the process of making the compositions, the extruder will not melt or soften the MCR without melting the SBS.

It has also been determined that an MCR that has an effective melting point significantly above room/ambient temperature should be selected; otherwise the "sponge-like" fragments of the compositions crumble into undesired smaller fragments in service.

One exemplary EPDM rubber is part number 512F manufactured by JS Tech Co. of Chonan, South Korea, which has an effective melting point of approximately 135-140° F. (57-60° C.). An example SBS is part number 3411 manufactured by LCY Elastomers of Dallas, Tex., which has been observed to have an effective melting point of about 200° F. (93° C.).

The difference in melting point between the MCR and the SBS may be as little as about 5° F. (2.8° C.), although the temperature difference is often much greater. The closer the melting point of the MCR to the melting point of the SBS, the more accuracy is needed in the heating process in the extruder.

Figure 3:
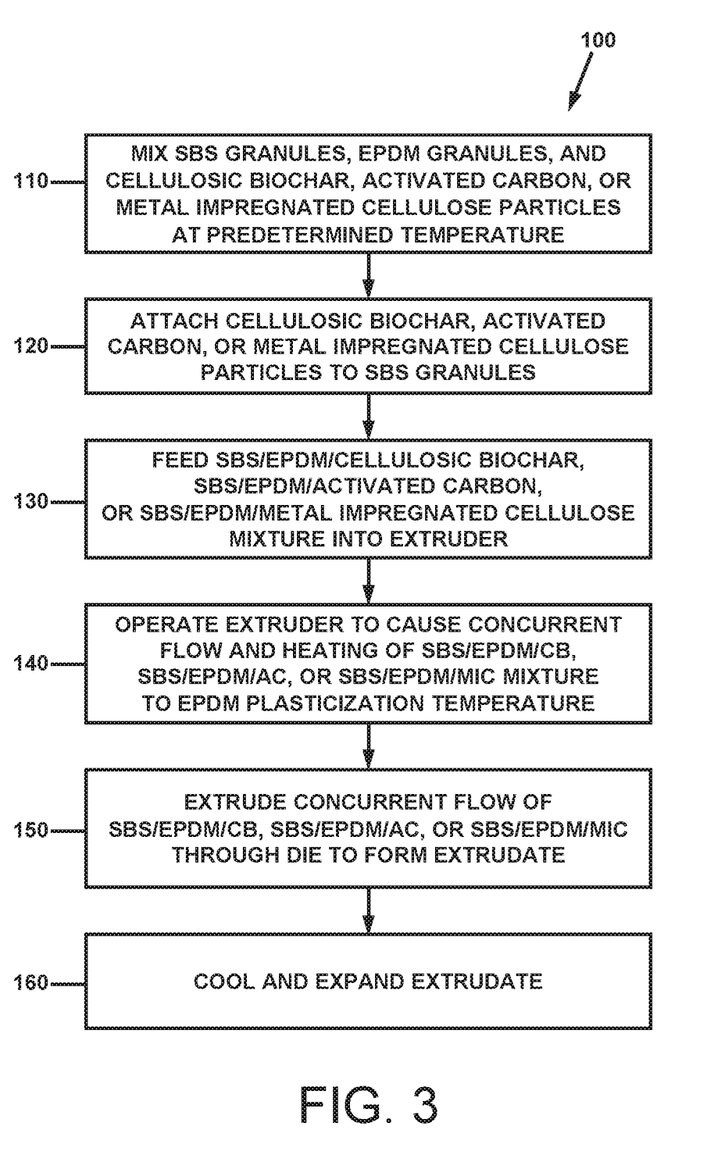
FIG. 3 is a flowchart depicting a method of making a composition for abatement of hydrocarbon, metal, synthetics, and phosphate pollutants in accordance with the present disclosure.

Before beginning example method 100, illustrated in FIG. 3, each of the materials (SBS, MCR, and OMM particles) is dried to a moisture content of less than about 0.5 percent water by weight. The SBS and MCR (both in granular form) and the OMM particles are then mixed, 110.

The mixture is heated to a temperature sufficiently high so as to enable the OMM particles to become attached, 120, to the SBS granules. This does not require very high heat. In one exemplary embodiment, an OMM/SBS/MCR mixture using MIC-type OMM particles is heated to a temperature of 95° F. (35° C.), which seemed sufficient to enable such attachment. In certain embodiments, due to the mixing and elevated temperature, the OMM particles are attached to the SBS granules by attaining penetration into fibers of the SBS granules so as not to be released during a subsequent extrusion process. At the elevated temperature, the SBS granules may enlarge, such that pores therein increase in size, thereby allowing smaller OMM particles to impregnate the pores and become attached to the SBS granules.

Through experimental trials in which EPDM was the MCR in the composition, it has been determined that the loading of BC in the SBS and EPDM is preferably between 20 and 28 percent of total weight of BC, SBS, and EPDM. A preferred loading is 28 percent. At loadings below 20 percent by weight, the BC can be successfully blended with the SBS and EPDM, but the resulting composition has less capacity for abatement of heavy metals and phosphorous. At loadings of 29-30 percent by weight, it has been determined that the BC does not blend into the SBS and EPDM satisfactorily. Instead, the BC clumps together significantly, which reduces the permeability of the end product.

Through experimental trials (with EPDM as the MCR), it has been determined that the loading of AC in the SBS and EPDM is preferably between 20 and 24 percent of total weight of AC, SBS, and EPDM. A preferred loading is 24 percent. At loadings below 20 percent by weight, the AC can be successfully blended with the SBS and EPDM, but the resulting composition has less abatement capacity. At loadings of 25-30 percent by weight, it has been determined that the AC does not blend into the SBS and EPDM satisfactorily, instead forming undesired clumps that reduce the permeability of the end product.

Through experimental trials (with EPDM as the MCR), it has been determined that the loading of MIC in the SBS and EPDM is preferably between 20 and 28 percent of total weight of MIC, SBS, and EPDM. A preferred loading is 28 percent. At loadings below 20 percent by weight, the MIC can be successfully blended with the SBS and EPDM, but the resulting composition has less abatement capacity. At loadings of 29-30 percent by weight, it has been determined that the MIC would not blend into the SBS and EPDM and be adhered satisfactorily.

The SBS/MCR granule and OMM particle mixture is then fed, 130, into an entry port of an extruder. The screw of the extruder is operated, 140, causing concurrent flow and heating of the SBS/MCR/OMM particle mixture along the barrel of the extruder. The concurrent flow under high pressure and high shear causes the heating of the mixture, which may be supplemented with a heater outside of the barrel.

The extrusion and heating conditions are controlled such that the heating of the SBS/MCR/OMM mixture is to a temperature that is close to or greater than the effective melting temperature of the MCR and less than the effective melting temperature of the SBS, so that the MCR becomes at least viscous. At such a temperature, the EPDM begins to soften and melt, thereby creating a matrix that binds to the SBS and OMM particles. Additionally, the concurrent flow of the mixture changes it from a granular state to a sponge-like form.

For OMM/SBS/EPDM embodiments, experiments have suggested the usefulness of certain embodiments in which the temperature inside the extrusion barrel is kept within a range extending from a lower value that is about 15° F. (8° C.) below the effective melting point of the MCR to a higher value that is about 10° F. (6° C.) above the effective melting point. For an exemplary MCR that is EPDM with an effective melting point observed in the extruder at about 135° F. (57° C.), for example, the extruder might be set at a temperature setting in the range of about 120-130° F. (49-54° C.). The location where the desired temperature is reached may be just before the end region of the extruder.

An MCR with a higher melting temperature, such as roughly 170-180° F. (77-82° C.), enables the synthesis of a composition that retains its shape as expanded fragments (as described subsequently herein) when exposed to higher-than-ambient temperatures. Advantageously, such a composition can be used to purify heated wastewater streams. Another exemplary EPDM rubber that may be suited for such applications is Nordel® NDR 4820P EPDM Hydrocarbon Rubber, manufactured by the Dow Chemical Company of Midland, Mich., which has a melting point of about 194° F. (91° C.).

Operation of the extruder continues, extruding, 150, the concurrent flow of the SBS/MCR/OMM material through a die (not shown) to form an extrudate.

The extruder may have a die, such as a circular die with a central rod or mandrel (not shown). If left undisturbed, the extrudate would form a cylindrical body with an axial hole. In certain embodiments, the die may include radial arms (not shown) at the end thereof, or a similarly configured cutter (not shown) that sections the cylindrical bodies into segments, perhaps four sections. An automatic knife may be triggered (not shown), such as every two seconds or so, cutting off lengths of the sections to form fragments.

When the extrudate exits the die into air at ambient pressure and temperature, it expands and cools, 160, into a body having fractures. Upon passing through the die, the SBS granules 280, which have been compressed somewhat from being forced through the die, reexpand, "fluffing" the extruded material while it slowly cools. Air remaining in the mixture further assists the expansion. After the extruded material is cut into suitable lengths, the resulting fragments slowly cool outside the extruder, and the fragments continue to expand for a time, causing additional fluffing.

The MCR matrix 290 (see FIG. 1) forms a durable but permeable structure for the SBS granules 280 and provides mechanical integrity to resulting fragments 200. Thus, fragments 200 formed in accordance with the preferred method resist breaking or cracking absent extreme elastic deformation, despite the presence of fissures 270. Also, such fragments do not detach easily in the form of flakes, crumbles, or dust.

The fluffing effect (conventionally undesired in extrusion processes) is actually beneficial in the inventive process because it forms inter-granular fissures 270 in the MCR matrix 290, throughout the structure. However, the fissuring is not so great as to cause loss of structural integrity.

As noted above, fissures are preferred to facilitate rapid passage of oil into fragments 200 and to reduce the incidence of gel blocking, permitting continued absorption. Additionally, the fissures provide additional exposed surface area of the OMM particles, thereby increasing the capacity of the fragments 200 to abate additional pollutants beside hydrocarbons, such as heavy metals, metal oxides, and various types of organics.

Slight irregularities in the flow rate, the fluffing effect, and the way in which the knife cuts the extrudate material can cause fragments of different sizes to form. For example, a larger-than-normal fragment can form when two adjacent sections link together. A smaller-than-normal fragment can form when a section breaks apart if fissuring caused by fluffing happens to occur along a fracture line. The resulting fragments 200 can appear similar in size and general appearance to popcorn.

Fragments 200 may be packaged into pouches, bags, sleeves, and other flexible containers, and can be used as floating skimmer or floating boom products that are deployable on water surfaces. Exemplary floating skimmer and boom products that may contain the fragments are disclosed in the '791 patent.

Alternatively, fragments 200 may be loaded into filter devices, including filter housings and other flow-through liquid-separation devices. Such filter devices may include a filter module supporting a multitude of fragments 200 between an entry port for the water flow and an exit port for the water flow. The filter module may be deployed in a pipe or in a filtration cartridge.

Figure 4:
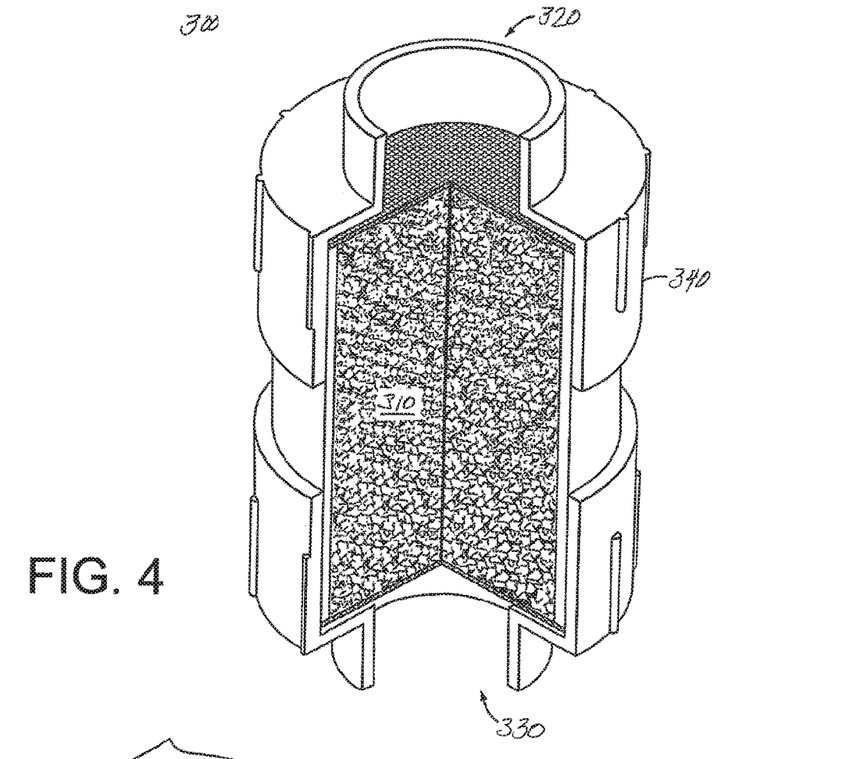
FIG. 4 depicts (in cut-away view) a filtration module that includes a filter cartridge containing a multitude of fragments that include biochar particles, activated carbon particles, or metal nanoparticles bound to an OMM according to various aspects of the present disclosure.

An exemplary filter module is shown in FIG. 4, in which filter module 300 includes a cartridge 340 having apertures 320 and 330, shown in this embodiment as being at opposite ends. Cartridge 340 is packed with fragments 310.

Figure 5:
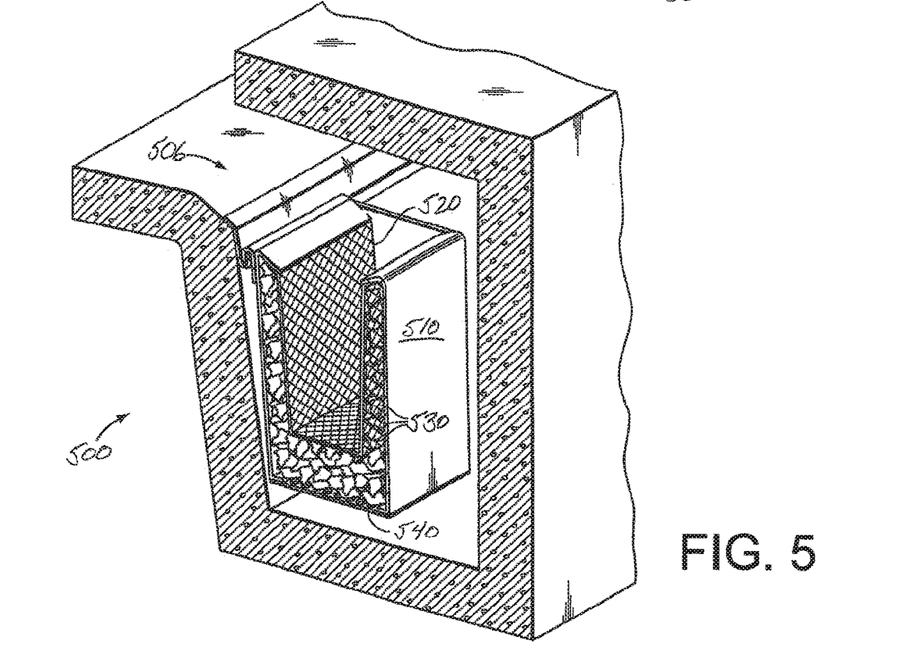
FIG. 5 depicts (in cut-away view) an open-topped filter device containing a multitude of fragments that include biochar particles, activated carbon particles, or metal nanoparticles bound to an OMM according to various aspects of the present disclosure.

The fragments may be disposed in an open-topped recess within the filter module of the filter device. An exemplary filter device with this structure is shown in FIG. 5. The filter device 500 is comprised of a hopper 510 containing a basket 520 (such as of a wire mesh material) forming a recess with an open top. A multitude of fragments 530 (of sorts described in connection with FIGS. 1 and 2 above) are contained in the space between hopper 510 and basket 520.

Hopper 510 may be configured to be suspended in a storm drain adjacent to a curb inlet, such as on a bracket. In use, runoff water (not shown) enters a curb-inlet 506 of the storm drain and passes into filter device 500. After entering hopper 510, the water passes through the mesh screen of basket 520, which traps trash items, and into and through the multitude of fragments 530. Accordingly, organic, metallic, and phosphate pollutants are removed from the runoff water, and the overall purity of the water passing out of hopper 510 (through perforated steel or plastic bottom 540) is improved.

The following examples describe MIC particle synthesis and combining MIC particles with hydrocarbon capturing medium. The examples are to be considered exemplary and not limiting.

Example 1

Part 1: A quantity of 200 pounds (91 kg) of pine wood chips were weighed out and poured into a Model HRM4812 reactor manufactured and sold by the Scott Equipment Company of New Prague, Minn., having a volume of 150 cubic feet (4.25 m$^3$). The reactor was equipped with a horizontal rotatable auger capable of agitating dry solids and liquid-solid mixtures contained therein.

In a first separate vessel, 35.3 pounds (15.5 kg) of sodium hydroxide pellets were added to 32.6 pounds (14.8 kg) of water with stirring. The NaOH pellets dissolved to result in a highly concentrated caustic solution. The solution was allowed to cool to ambient temperature.

The NaOH solution was transferred into a second separate vessel, with stirring, containing 24.0 gallons (91 liters) of Quat 188 Cationic Monomer, an aqueous solution of N-(3-chloro-2-hydroxypropyl) trimethylammonium chloride at a concentration of 65 percent by weight, manufactured and sold by the Dow Chemical Company of Midland, Mich.

Upon completion of the Quat 188 transfer, the reactor was closed, and a recirculating pump and a heater were activated, providing heat to the reactor vessel through a jacket surrounding the vessel wall. The heater was programmed to heat the vessel and contents to 176° F. (80° C.). The horizontal agitator was set to maintain a mixing speed of 20-25 RPM. The heating and mixing were continued for five hours.

The reactor was allowed to cool overnight to ambient temperature. Upon opening the reactor, the quaternized wood chips were observed to have a golden brown color. This was considered desirable, because in other experimental trials in which the wood was further reacted to a point of having a charred look, the resulting end product was unsatisfactory.

In a third separate vessel, 1.94 gallons (7.3 liters) of hydrochloric acid at a concentration of 31 percent by weight was added to 27.65 gallons (105 liters) of ferric chloride solution at a concentration of 40 percent by weight. The resulting quantity consisting of 29.6 gallons (112 liters) of solution was injected through a spray nozzle into the reactor and was spread uniformly on the wood chips by mixing the reactor at a speed of 20-25 RPM.

This chelating reaction was performed for 30 minutes. It was determined that 30 minutes is preferred. In other trials, when the reaction was allowed to continue to about 45 minutes, the wood chips had a dark brown or black color and appeared burned, and the resulting end product was unsatisfactory.

In a fourth separate vessel, 71.9 gallons (272 liters) of ammonium hydroxide was prepared at a concentration of 28 percent by weight. The NH$_4$OH solution was transferred to the reactor with mixing at a speed of 20-25 RPM. Upon completion of the transfer of NH$_4$OH solution, the recirculating pump and the heater were activated, with the heater programmed to heat the vessel and contents to 176° F. (80° C.). The horizontal agitator maintained a mixing speed of 20-25 RPM.

The heating and mixing was continued for ten hours, resulting in the drying of the wood chips to a moisture content of less than 5 percent water by weight.

Three repeated washings of the wood chips were performed by repeatedly adding 200 gallons (757 liters) of water to the reactor with stirring, then draining the water through a bottom port in the reactor, which was equipped with a screen to retain the wood chips.

Upon completion of the washings, the recirculating pump and the heater were activated, with the heater programmed to heat the vessel and contents to 176° F. (80° C.). The horizontal agitator maintained a mixing speed of 20-25 RPM. The heating and mixing was continued for a duration of ten hours, resulting in the drying of the wood chips to a moisture content of less than 5 percent water by weight.

Once the wood chips were dry, a gate valve on the reactor bottom was opened, and the wood chips were discharged into a pair of barrels.

The resulting end product, wood chips with iron nanoparticles joined thereto, weighed about 236 pounds (107 kg) and had an elemental iron content of about 12 percent by weight. This end product was subsequently used in preparing a batch of the multifunctional composition, as will be described subsequently.

In other experimental trials, wood chips with an elemental iron content of up to about 35 weight percent were attained. The production of higher iron content MIC particles is contemplated.

Part 2: Wood particles containing iron oxide nanoparticles as described in Part 1 above were used as the MIC particle component of the end product. SBS and EPDM granules were used as the hydrocarbon capturing medium of the end product. The SBS and EPDM granules were the JS Tech and LCY materials identified above.

Neither the granules nor the particles were spherical in shape. The granules and particles had the following characteristic dimensions (approximate average of length, width, and thickness):

SBS: 3350 microns (6 mesh screen).
EPDM: 425 microns (40 mesh screen).
Wood particles: wood chips of 3350 microns (6 mesh screen) with wood sawdust of about 500 microns (35 mesh screen) also being present. (The wood chips as supplied from the manufacturer contained a small proportion of wood sawdust, less than about 10 percent by weight, due to spalling.)

Before beginning the process for combining the materials, the individual separate batches of materials were dried to a moisture content of no more than 0.5 percent water by weight.

Next, 50 lbs. (22.7 kg) of SBS granules, 22 lbs. (10 kg) of EPDM granules, and 28 lbs. (12.7 kg) of iron-containing wood particles were added to a Model 42N-5 blender manufactured and sold by Charles Ross & Son Company of Hauppauge, N.Y.

The blender was equipped with a Model 1712-A5 temperature controller. The controller was set to operate a heater to provide a mixing chamber temperature of 95° F. (35° C.). The three materials were mixed at 95° F. (35° C.) for 15 minutes at a mixing speed of 56.8 RPM. The mixture was allowed to cool and was removed from the blender.

Experimental trials and analysis of resulting mixtures revealed that, at this temperature, the wood particles attained penetration into fissures of the SBS granules. At the elevated temperature, the SBS granules apparently enlarge, such that pores and fissures therein increase in size, thereby allowing smaller MIC particles to impregnate the pores and become strongly attached to the SBS granules.

Part 3: The resulting mixture was placed in a feed hopper of a 2-inch (about 5-cm) extruder with packer manufactured and sold by The Bonnot Company of Akron Ohio Before operating the extruder, the barrel was heated using a temperature setting of 110° F. (43° C.), which enabled the materials within the extruder to reach the desired temperatures during operation of the extruder.

The screw of the extruder was actuated at a speed of 50 RPM, drawing in the SBS/EPDM/MIC mixture from the feed hopper and causing the mixture to heat and flow axially along the barrel.

Temperature data indicated that the mixture reached a temperature of about 120-130° F. (49-54° C.) at a location just before the die at the end of the extruder barrel.

Operation of the extruder continued, resulting in delivery of the extrudate through a die having an orifice diameter of 1.25 inches (3.175 cm). The extrudate expanded to a diameter of about 1.75 inches (4.5 cm). Based on observations of the extrudate that was discharged from the extruder, the physical aspect of the flowing mixture changed from loose particles at the feed hoppers to a sponge-form.

The extrudate was cut by vertical and horizontal knife blades along the axial direction into four equal sections, and each of the sections were subsequently cut into small pieces of about 0.5×0.75 inches (roughly 1-2 cm), which resulted in the end product suitable for use in products described previously herein.

The composition of the end product fragments was 50 percent SBS by weight, 22 percent EPDM by weight, and 28 percent wood particles with iron oxide nanoparticles by weight.

Based upon the teachings of the aforementioned '791 patent, and upon experience obtained in developing the hydrocarbon absorbing compositions and products of the '791 patent, it was expected that the permeability of water through compositions and products of the above example materials would be significantly decreased due to the addition of the MIC, given that the MIC was substantially impermeable, and as a result the gel blocking effect would be increased. It was also expected that the capacity for absorbing hydrocarbon materials would be reduced, due to both the diluting effect of the added MIC material and reduced permeability, which would prevent waste water from contacting all of the interstices and thus maximizing hydrocarbon absorption. Capacity for metals and phosphate (or other organic) abatement was considered unpredictable, but it was expected to also be adversely affected if the MIC material reduced the permeability of the compositions.

Contrary to such expectations, the experimental exemplary compositions and products surprisingly had negligible reduction in permeability and retained substantial efficacy in absorbing hydrocarbons, as compared to materials made according to the '791 patent, and were also effective in removing metals and phosphates in simulated and actual waste water samples. This was determined by performing testing protocols as follows:

Permeability testing: A cylindrical column 2 inches (5 cm) in diameter and 72 inches (1.83 m) long (four 18 inch long (46 cm) columns joined in series) was mounted in a vertical position on a fixture and provided with an outlet port which discharged through a flow meter. A vessel was provided above the column, with a drain connected to the top of the column through a valve. Opening the valve resulted in immediate flooding at the top of the column.

For permeability testing of standard hydrocarbon absorbing medium made according to the disclosure of the '791 patent, the column was packed with such medium. For permeability testing of the experimental hydrocarbon, metals, and phosphorous absorbing medium of the present disclosure, the column was packed with a medium prepared in accordance with Example 1 above. Care was taken in both instances to pack the columns with fragments of media of the same size and to pack the column at the same density and weights of media. In both permeability tests, the top of the column was flooded substantially instantaneously, and the rate of flow from the discharge port of the column was measured until the vessel was drained and flow ceased.

TABLE 1 provides a comparison of the rates at which effluent flowed through the two media, as well as through separate MIC particles not mixed and extruded with SBS and EPDM. (In the following tables, "SMPK SS" refers to the standard hydrocarbon absorbing medium, and "SMPK SS HM" refers to the experimental hydrocarbon, metals, and phosphorous absorbing medium that included MIC particles.) Flow was gravity driven, i.e., no additional head pressure was applied to the columns to cause an increase in flow rate. For each medium, the times required to drain to column depths of 1-5 feet (30-152 cm), measured from the top of the column, are shown. Thus, longer times indicate lesser permeability.

TABLE 1

Comparison of permeability of standard hydrocarbon absorbing medium, MIC particles, and hydrocarbon, metals, and phosphorous absorbing medium containing MIC particles.

| Filter Bed Depth | | 1 ft (30 cm) | 2 ft (61 cm) | 3 ft (91 cm) | 4 ft (122 cm) | 5 ft (152 cm) |
|---|---|---|---|---|---|---|
| Flow Time Average (min) | SMPK SS | 0.3 | 0.587 | 1 | 1.287 | 1.37 |
| | SMPK SS HM | 0.32 | 0.577 | 1.05 | 1.305 | 1.41 |
| | MIC particles only | 1.64 | 4.01 | 5.98 | 7.23 | 9.71 |

It can be seen from the data that the permeability of the standard hydrocarbon absorbing medium and the hydrocarbon, metals, and phosphorous absorbing medium containing MIC particles are substantially the same. Additionally, it can be seen that the flow times for a packed bed containing only MIC particles were much longer, and thus the permeability of MIC particles alone is much lower.

Hydrocarbon, metals, and phosphate removal testing: A cylindrical glass column 2 inches (5 cm) in diameter and 18 inches long (46 cm) was mounted in a vertical position on a fixture and provided with an outlet port that discharged through a valve. The same precautions were taken with respect to packing the column with the respective materials.

Samples of waste water were obtained from locations including Norwalk, Calif., and Brighton, United Kingdom. For each waste water sample (hereafter called "influent"), prior to treatment with the media, measurements were made of (a) alkalinity, biochemical oxygen demand (BOD), total suspended solids (TSS), and turbidity; and (b) concentrations of a variety of metallic elements and total phosphate.

For each waste water sample, following the above influent measurements, the column was flooded with the wastewater. When flooding was complete, i.e., when the medium was completely wetted and no air was present, the valve at the bottom of the column was opened. A "time zero" or "effluent pour through" sample was taken immediately, then additional samples were taken at subsequent time intervals of 2 minutes, 3 minutes, and 5 minutes, and then a final, i.e., an "empty bed contact time" (EBCT) sample was taken 10 seconds after the last of the effluent discharged from the column at the end of draining it, i.e., 10 seconds post-EBCT. The above alkalinity, BOD, TSS, turbidity, and chemical concentrations were measured for all samples.

TABLE 2 provides a comparison of the efficacy of the standard hydrocarbon absorbing medium and the hydrocarbon, metals, and phosphate absorbing medium in removing various metals and phosphate for a representative waste water sample. For the two media, the data in TABLE 2 is for an effluent sample taken at 10 seconds post-EBCT.

TABLE 2

Comparison of efficacy of chemical constituent removal for standard hydrocarbon absorbing medium and hydrocarbon, metals, and phosphate absorbing medium. (Samples for analysis were taken 10 seconds post-EBCT, with the exception of a sample for measurement of selenium, which was taken 30 minutes post-EBCT.)

| Material | Units | Untreated sample Concentration | SMPK SS Concentration | SMPK SS Percent removal | SMPK SS HM Concentration | SMPK SS HM Percent removal |
| --- | --- | --- | --- | --- | --- | --- |
| Aluminum | ppb | 24.13 | 24.34 | −0.9% | 82.42 | −241.6% |
| Arsenic | ppb | 32.00 | 31.12 | 2.8% | 2.94 | 90.8% |
| Cadmium | ppb | 109.51 | 105.13 | 4.0% | 9.04 | 91.7% |
| Chromium | ppb | 8.60 | 8.43 | 2.0% | 1.17 | 86.4% |
| Copper | mg/l | 3.00 | 3.14 | −4.7% | 0.11 | 96.2% |
| Hydrocarbon | mg/l | 56.00 | 2.43 | 95.7% | 3.14 | 94.4% |
| Iron | mg/l | 12.00 | 12.30 | −2.5% | 1.30 | 89.2% |
| Lead | ppb | 34.54 | 35.13 | −1.7% | 4.22 | 87.8% |
| Manganese | mg/l | 4.37 | 4.24 | 3.0% | 1.05 | 76.0% |
| Molybdenum | mg/l | 2.20 | 2.21 | −0.5% | 0.31 | 85.9% |
| Selenium | ppb | 2.15 | 2.12 | 1.4% | 0.28 | 87.0% |
| Strontium | mg/l | 2.81 | 2.73 | 2.8% | 2.49 | 11.4% |
| Zinc | mg/l | 25.14 | 23.54 | 6.4% | 4.35 | 82.7% |
| Total Phosphate | mg/l | 8.20 | 8.27 | −0.9% | 0.24 | 97.1% |

It can be seen that the hydrocarbon, metals, and phosphate absorbing medium of the present disclosure is equally effective in removal of hydrocarbons, and far more effective in removing phosphates and metals (with the exception of aluminum), in comparison with the hydrocarbon absorbing medium of the '791 patent. Additionally, with the exceptions of aluminum and strontium, the hydrocarbon, metals, and phosphates absorbing medium removed a very high proportion of the metals present in the influent waste water sample. It is further noted that the influent sample had a nearly neutral pH of 7.17, which remained substantially unchanged after treatment with either medium.

Examples 2 and 3

Exemplary hydrocarbon, metals, and phosphate absorbing compositions of the present disclosure were also prepared, in which the OMM was pyrolyzed. In one embodiment, the pyrolyzed OMM was biochar. In another embodiment, the pyrolyzed OMM was activated carbon. Mixing and extrusion processes for these compositions were similar to the processes for mixing and extrusion of the composition disclosed in EXAMPLE 1 above. Testing protocols were performed as described above for the media set forth in TABLE 1 and TABLE 2.

TABLE 3 provides a comparison of the rates at which effluent flowed through the standard hydrocarbon absorbing medium SMPK SS and through experimental hydrocarbon, metals, and phosphate absorbing media that included BC and AC particles. Flow was gravity driven as per the testing protocol described previously. Longer times indicate lesser permeability.

TABLE 3

Comparison of permeability of standard hydrocarbon absorbing medium and hydrocarbon, metals, and phosphate absorbing media containing biochar particles and activated carbon particles.

| Filter Bed Depth | | 1 ft (30 cm) | 2 ft (61 cm) | 3 ft (91 cm) | 4 ft (122 cm) | 5 ft (152 cm) |
| --- | --- | --- | --- | --- | --- | --- |
| Flow Time Average (min) | SMPK SS | 0.3 | 0.587 | 1 | 1.287 | 1.37 |
| | SMPK SS Biochar | 0.41 | 0.588 | 1.13 | 1.403 | 1.40 |
| | SMPK SS Activated carbon | 0.38 | 0.692 | 1.32 | 1.556 | 1.65 |

It is apparent from the data that the permeability of the standard hydrocarbon absorbing medium is substantially the same as the permeability of the hydrocarbon, metals, and phosphate absorbing medium containing BC particles, and that the permeability of the standard hydrocarbon absorbing medium is only slightly greater than the permeability of the hydrocarbon, metals, and phosphate absorbing medium containing AC particles.

TABLE 4 presents data on the efficacy of the two media comprised of pyrolyzed OMM in removing various metals and phosphate for a representative waste water sample. For the two media, the data in TABLE 4 is for an effluent sample taken at 10 seconds post-EBCT.

TABLE 4

Efficacy of chemical constituent removal for media having pyrolyzed cellulosic matrix material (biochar medium and activated carbon medium).

| Material | Units | Untreated sample Concentration | Biochar Concentration | Biochar Percent removal | Activated Carbon Concentration | Activated Carbon Percent removal |
| --- | --- | --- | --- | --- | --- | --- |
| Aluminum | ppb | 24.13 | 7.26 | 69.9% | 22.91 | 5.1% |
| Arsenic | ppb | 32.00 | 7.82 | 75.6% | 8.36 | 73.9% |
| Cadmium | ppb | 109.51 | 30.32 | 72.3% | 78.97 | 27.9% |
| Chromium | ppb | 8.60 | 11.65 | −35.5% | 5.33 | 38.0% |
| Copper | mg/l | 3.00 | 0.512 | 82.9% | 2.880 | 4.0% |
| Hydrocarbon | mg/l | 56.00 | 3.880 | 93.1% | 4.320 | 92.3% |
| Iron | mg/l | 12.00 | 4.56 | 62.0% | 10.78 | 10.2% |
| Lead | ppb | 34.54 | 6.86 | 80.1% | 25.45 | 26.3% |
| Manganese | mg/l | 4.37 | 1.26 | 71.2% | 3.70 | 15.3% |
| Molybdenum | mg/l | 2.20 | 0.65 | 70.5% | 2.05 | 6.8% |
| Selenium | ppb | 2.15 | 0.98 | 54.4% | 1.95 | 9.3% |
| Strontium | mg/l | 2.81 | 1.43 | 49.1% | 1.48 | 47.3% |
| Zinc | mg/l | 25.14 | 12.73 | 49.4% | 23.67 | 5.8% |
| Total Phosphate | mg/l | 8.20 | 6.20 | 24.4% | 8.34 | −1.7% |

It can be seen that the compositions comprised of pyrolyzed OMM, i.e., BC and AC, were considerably more effective in abatement of most of the metals in TABLE 4, as compared to the hydrocarbon absorbing medium SMPK SS of TABLE 2.

There has been provided in accordance with the present disclosure, material compositions, methods of synthesis thereof, and products including the compositions, in which the compositions have multifunctional capabilities in abatement of water pollution.

What is claimed is:

1. A composition of matter comprising particles of an organic matrix material (OMM) attached to styrene-butadiene-styrene (SBS) granules embedded in an M-Class rubber (MCR) matrix.

2. The composition of claim 1, wherein the OMM particles are impregnated with metal nanoparticles and the MCR is ethylene propylene diene monomer (EPDM).

3. The composition of claim 2, wherein the OMM particles are biochar particles that are present at a proportion of between 20 and 28 percent of total weight of biochar particles, SBS, and EPDM.

4. The composition of claim 2, wherein the OMM particles are cellulosic particles.

5. The composition of claim 4, wherein the cellulosic particles are present at a proportion of between 20 and 28 percent of total weight of cellulosic particles, SBS, and EPDM.

6. The composition of claim 2, wherein the metal nanoparticles are iron nanoparticles.

7. The composition of claim 6, wherein the OMM particles are cellulosic particles and the cellulosic particles contain 10-50% by weight of elemental iron.

8. The composition of claim 4, wherein the cellulosic particles are comprised of wood particles.

9. The composition of claim 2, wherein the OMM particles are activated carbon particles.

10. The composition of claim 9, wherein the activated carbon particles are present at a proportion of between 20 and 24 percent of total weight of cellulosic particles, SBS, and EPDM.

11. The composition of claim 1, wherein the MCR matrix is an ethylene propylene diene monomer (EPDM) matrix.

12. A method of forming a solid body capable of removing oil and metallic elements entrained in a volume of water, the method comprising:
   a) forming a mixture of (i) particles of an organic matrix material (OMM) attached to styrene-butadiene-styrene (SBS) granules and (ii) granules of an M-Class rubber (MCR), by mixing the OMM particles, SBS granules, and MCR granules;
   b) feeding the mixture of part (a) through an extruder, and heating the mixture in the extruder; and
   c) extruding the heated mixture through a die.

13. The method of claim 12 further comprising impregnating the OMM particles with metal nanoparticles prior to forming the mixture.

14. The method of claim 12, wherein the OMM particles are biochar particles and the MCR is ethylene propylene diene monomer (EPDM), and wherein the biochar particles form a proportion of between 20 and 28 percent of total weight of biochar particles, SBS, and EPDM.

15. The method of claim 12 further comprising automatically cutting the mixture as it passes out of the die to form fragments.

16. The method of claim 12, wherein the OMM particles are cellulosic particles impregnated with metal nanoparticles and the MCR is ethylene propylene diene monomer (EPDM).

17. The method of claim 16, wherein the cellulosic particles are present at a proportion of between 20 and 28 percent of total weight of cellulosic particles, SBS, and EPDM.

18. The method of claim 12, wherein the OMM particles are activated carbon particles and the MCR is ethylene propylene diene monomer (EPDM).

19. The method of claim 18, wherein the activated carbon particles are present at a proportion of between 20 and 24 percent of total weight of cellulosic particles, SBS, and EPDM.

20. The method of claim 12, wherein part (b) comprises heating the mixture in the extruder to a temperature that is greater than 15° F. (8° C.) below an effective melting point of the MCR at the pressure in the extruder and less than 10° F. (6° C.) above the effective melting point of the MCR at the pressure in the extruder, and also less than an effective melting point of the SBS at the pressure in the extruder.

21. The method of claim 20, wherein heating the mixture in the extruder comprises heating the mixture by setting the extruder to a temperature of between 49° C. and 54° C.

22. A filter device for capturing oil and metallic elements entrained in a volume of water in a constrained flow, the device comprising (a) a multitude of fractured fragments comprised of particles of an organic matrix material (OMM) attached to styrene-butadiene-styrene (SBS) granules embedded in an M-Class rubber (MCR) matrix; and (b) a filter module supporting the fragments between an entry port for the water flow and an exit port for the water flow.

23. The filter device of claim 22, wherein the OMM particles are impregnated with metal nanoparticles and the MCR is ethylene propylene diene monomer (EPDM).

24. The filter device of claim 23, wherein the OMM particles are biochar particles that are present at a proportion of between 20 and 28 percent of total weight of biochar particles, SBS, and EPDM.

25. The filter device of claim 23, wherein the OMM particles are cellulosic particles.

26. The filter device of claim 23, wherein the OMM particles are activated carbon particles.

27. The filter device of claim 22, wherein the filter module is deployed in a pipe.

28. The filter device of claim 22, wherein the filter module is deployed in a filtration cartridge.

29. The filter device of claim 22 wherein the fragments are disposed in a recess including an open top within the filter module.

30. The filter device of claim 22, wherein the MCR matrix is an ethylene propylene diene monomer (EPDM) matrix.

31. A method for capturing oil and metallic elements entrained in a volume of water, the method comprising directing flow of a water stream through interstices of a multitude of fractured fragments of contaminant-sorbent, hydrophobic bodies of a filter medium comprised of particles of an organic matrix material (OMM) attached to styrene-butadiene-styrene (SBS) granules embedded in an M-Class rubber (MCR) matrix.

32. The method of claim 31, wherein the fractured fragments are between 1 and 2 centimeters.

33. The method of claim 31, wherein the OMM particles are biochar particles impregnated with metal nanoparticles.

34. The method of claim 31, wherein the OMM particles are cellulosic particles impregnated with iron nanoparticles.

35. The method of claim 31, wherein the OMM particles are activated carbon particles.

36. The method of claim 31, wherein the MCR matrix is an ethylene propylene diene monomer (EPDM) matrix.

* * * * *

UNITED STATES PATENT AND TRADEMARK OFFICE
CERTIFICATE OF CORRECTION

PATENT NO. : 11,124,432 B2
APPLICATION NO. : 16/408326
DATED : September 21, 2021
INVENTOR(S) : Shawn M. Lolling and Bruce R. Gan It is certified that error appears in the above-identified patent and that said Letters Patent is hereby corrected as shown below:

In the Claims
In Column 21, Line 30 (Claim 10), change "cellulosic particles" to --activated carbon particles--
In Column 22, Line 6 (Claim 19), change "cellulosic particles" to --activated carbon particles--

Signed and Sealed this
Twenty-fourth Day of January, 2023

Katherine Kelly Vidal
*Director of the United States Patent and Trademark Office*